May 26, 1936.  L. H. KUEHN ET AL  2,042,406
SUPPORT FOR POPCORN POPPERS
Filed Oct. 24, 1935

INVENTORS
Leo H. Kuehn
Herman W. Fritz Jr.
BY Parkinson & Lane
ATTORNEYS.

Patented May 26, 1936

2,042,406

UNITED STATES PATENT OFFICE 2,042,406

SUPPORT FOR POPCORN POPPERS

Leo H. Kuehn and Herman W. Fritz, Jr., Royal Oak, Mich.

Application October 24, 1935, Serial No. 46,562

8 Claims. (Cl. 53—4)

This invention relates to an adjustable swingable support for supporting over a source of heat various types of receptacles suitable for popping popcorn. This device is so constructed as to allow a free swinging motion of the popcorn popper during the popping operation. The support is made adjustable so that receptacles of various sizes and shapes may be supported thereon. The support is so arranged that a free circulation of air beneath the receptacle is possible. The support may be so constructed as to be useable with various types of heat source such as a kitchen stove, open fire, electric heater, gas flame, charcoal burner or other suitable source of heat. Its construction may be varied as desired to best adapt it for the particular type of heat source used. The support allows of either manual or mechanical power being used in moving the receptacle.

Our improved support comprises in general a base of any form which will act as a suitable foundation, but will not seriously interfere with the flow of heat from the source to the receptacle. Rigid uprights are fastened to or made as part of the base and an adjustable swinging member for supporting the receptacle is attached to these uprights. Depending lugs, which may be made removable, may be attached to the base to aid in preventing possible slipping of the device when in use.

Among the objects of our invention is to provide a popcorn popper support having the advantages above set forth.

A further object is to provide a popcorn popper support enabling a free swinging motion to be imparted to the popper and so arranged as to enable the maximum utilization of the heat in a manner to greatly increase the efficiency of the popping operation.

A still further object is the provision of a popcorn popper support of few parts, economical to manufacture, possessing strength and rigidity, easy to operate, efficient in performance, and capable of easy transportation to and use in connection with many different kinds of sources of heat.

Another object is adjustability of length of the swinging element to accommodate our device to various conditions of use.

Other objects, advantages and capabilities will later more fully appear.

Our invention further resides in the combination, construction and arrangement of parts illustrated in the accompanying drawing, and while we have shown therein a preferred embodiment we wish it understood that the same is susceptible of modification and change without departing from the spirit of our invention.

In the drawing:—

Figure 1:
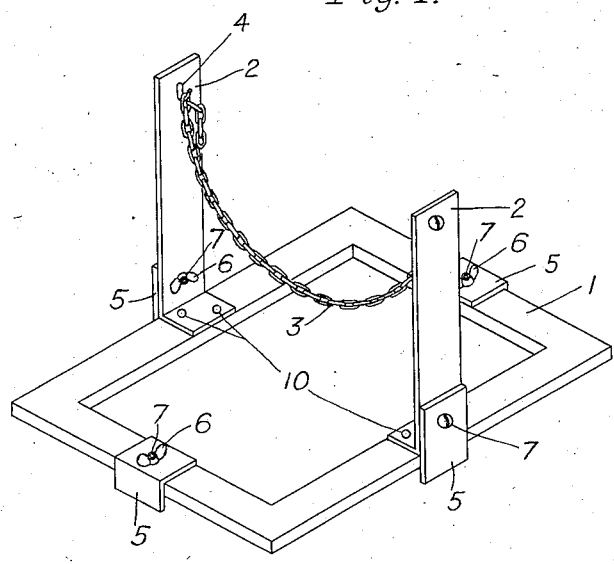
Fig. 1 is a perspective view of a popcorn popper support embodying this invention.

Referring in detail to the drawing, the popcorn popper support consists of an openwork base 1, rigidly attached uprights 2, a swingable member attached to the uprights, which in this case is a chain 3, the swingable member being made adjustable by hooking any of the links near the end of the chain on the hook 4 secured to the upright 2. The cleats or lugs 5 may be removed by removal of the wing nuts 6 and bolts 7.

Figure 2:
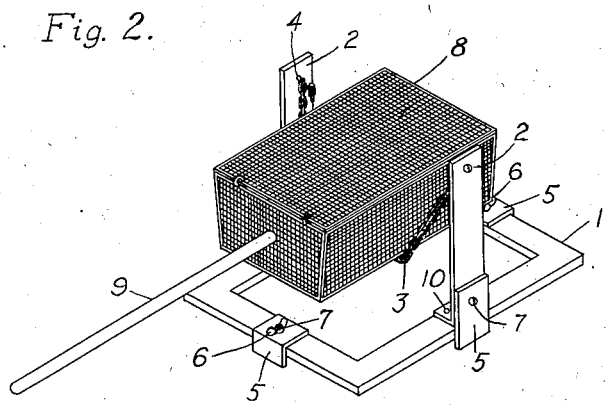
Fig. 2 shows the device of Fig. 1 supporting a receptacle for popping corn.

In Fig. 2 the receptacle 8 for popping popcorn is shown with an attached handle 9 for manually moving the receptacle.

The uprights 2 are shown as secured to the base 1 by rivets, bolts or the like 10, but any other suitable fastening means may be employed as desired. Also said uprights may be removable from the base if preferred. While we have shown the two side lugs or cleats 5 as being flat and removably secured to the side faces of the uprights, they may be of other shapes, if preferred, such as angle plates, like those shown at the two ends of the base, and secured to the base in a similar manner out of alignment with the uprights. The purpose of these lugs or cleats is to prevent undue sliding of the base on whatever surface they may rest upon. When our device is used upon a kitchen gas range or the like, these lugs or cleats will enter the spaces between the openwork spider or grid usually present over the flame of the gas burner. Also when our device is used over an open fire these lugs or cleats will serve to prevent sliding of the device on whatever surface it may be resting. They thus serve as antiskid devices over any source of heat that may be used.

While we have shown only one chain for illustrative purposes, we wish it understood that two or more such chains spaced any desired distance apart may be used without departing from the spirit of our invention. Also any other number and arrangement of lugs or cleats 5 may be used as desired.

In use the corn popper will be seated upon the chain or chains, as shown in Fig. 2, the device having been placed over a suitable source of heat. A swinging or rocking motion is then applied to the popper manually through the handle 9, or other source of power, and the popper moved back and forth over the source of heat until the popping of the corn is completed. It may also be used for any other heating operation for which it is adapted, such as parching ordinary corn, toasting marshmallows, roasting wieners, etc. The popper will thus be held at the proper distance from the fire, which distance may be adjusted by selectively hooking the desired one of the chain links over the hook 4, a steady and controllable rocking motion imparted thereto, and the maximum of efficiency and ease in popping or heating obtained.

Having described our invention, we claim:

1. A swingable support for receptacles suitable for popping popcorn, the support comprising a portable openwork base, two spaced uprights attached to the base, and a flexible swingable supporting member attached adjacent the upper ends of the uprights.

2. An adjustable support for receptacles of various sizes and shapes suitable for popping popcorn, comprising a base, two uprights attached to the base, a flexible swingable member connected adjacent the upper ends of the uprights, one end of the flexible member being attached to an upright by means of a hook which may be connected at any one of a plurality of places on the flexible member so that an adjustment of the length of the flexible member may be made, removable lugs attached to the base to extend below the bottom face thereof and so arranged as to decrease the possibility of the base slipping when in use.

3. A swingable support for a popcorn popper, being adjustable so as to be usable with various shapes of poppers and so constructed as to be usable with various types of heat sources, comprising a portable openwork base, two spaced uprights attached to the base, and an adjustable swingable supporting member attached to the uprights adjacent the upper end thereof.

4. A swingable support for a popcorn popper, being adjustable so as to be usable with various shapes and sizes of poppers and so constructed as to be usable with various types of heat sources, which comprises a base, two spaced uprights attached to the base, a supporting chain fastened to the uprights adjacent the upper end thereof, one end of the chain being fastened to the upright by means of a hook on the upright, which hook may be entered at any link in the chain so that an adjustment of the length of the chain may be made, removable cleats on the base and projecting below the lower face thereof so as to decrease the possibility of the device slipping when in use.

5. A support for popcorn poppers and the like, comprising an openwork base to which spaced uprights are secured, and a flexible, non-inflammable elongated member secured at its ends to the uprights adjacent the upper ends thereof so as to swingably hang therebetween whereby a popper or the like may be swingably supported in the bight of the hanging elongated member.

6. A support for popcorn poppers and the like, comprising an openwork base to which spaced uprights are secured, and a flexible, non-inflammable elongated member secured at its ends to the uprights adjacent the upper ends thereof so as to swingably hang therebetween whereby a popper or the like may be swingably supported in the bight of the hanging elongated member, the elongated member being adjustably secured to the uprights to enable the selective increasing or decreasing of its droop.

7. A support for popcorn poppers and the like, comprising an openwork base to which spaced uprights are secured, and a flexible non-inflammable elongated member secured at its ends to the uprights adjacent the upper ends thereof so as to swingably hang therebetween whereby a popper or the like may be swingably supported in the bight of the hanging elongated member, the elongated member being adjustably secured to the uprights to enable the selective increasing or decreasing of its droop, and lugs secured to the base to extend below its bottom face to prevent undue sliding of the device while in operation.

8. A support for popcorn poppers and the like, comprising an openwork base to which spaced uprights are secured, and a flexible, non-inflammable elongated member secured at its ends to the uprights adjacent the upper ends thereof so as to swingably hang therebetween whereby a popper or the like may be swingably supported in the bight of the hanging elongated member, the elongated member being adjustably secured to the uprights to enable the selective increasing or decreasing of its droop, and lugs secured to the base to extend below its bottom face to prevent undue sliding of the device while in operation, the elongated member being a chain, the adjusting means for the chain comprising a hook secured to one of the uprights, over which hook any one of the links of the chain may be selectively hooked.

LEO H. KUEHN.
HERMAN WM. FRITZ, JR.